INVENTORS
OTTO C. WINZEN
BY VERA H. WINZEN

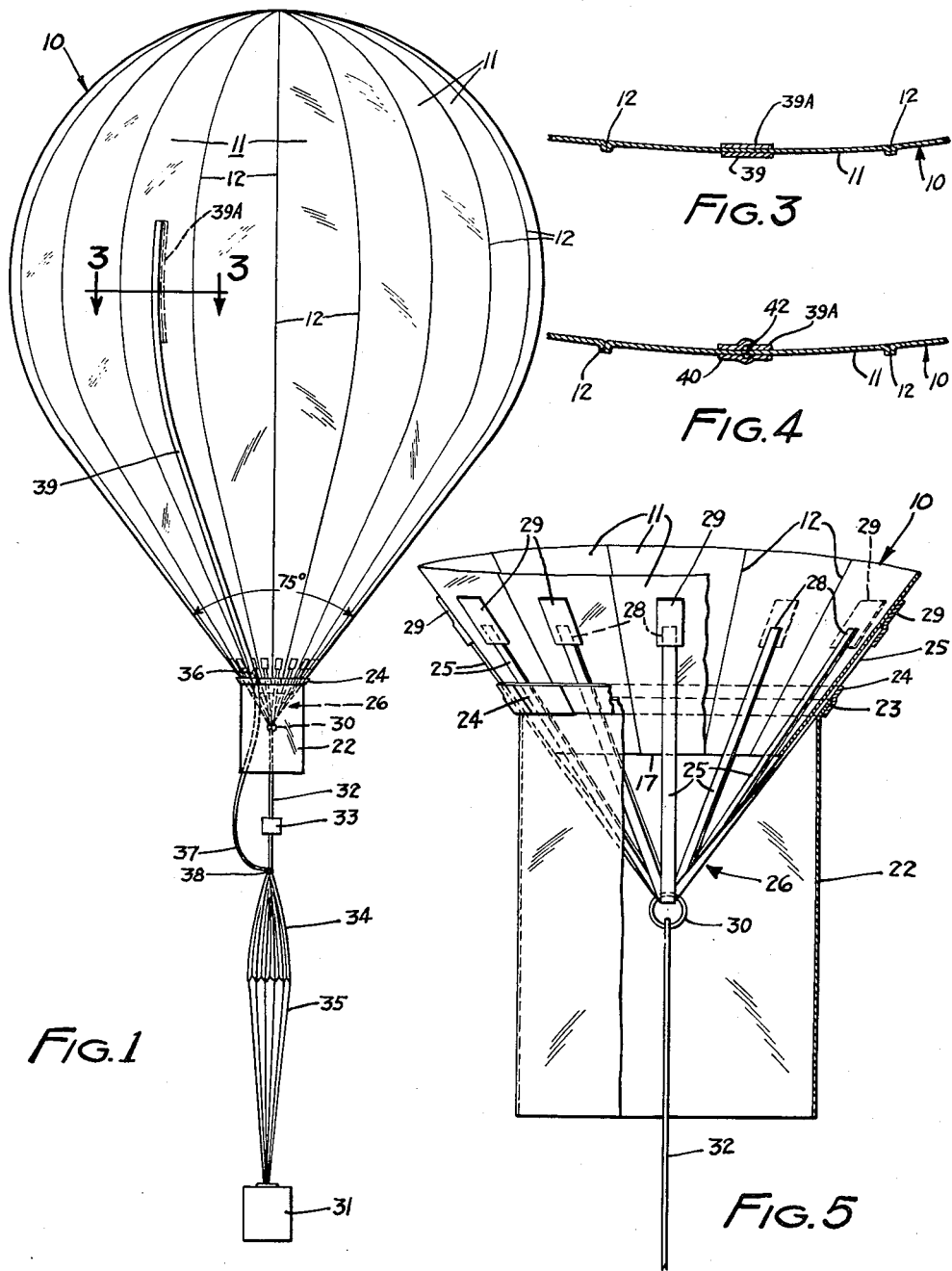

ATTORNEYS

July 31, 1956     O. C. WINZEN ET AL     2,756,948
SKIN STRESSED BALLOON
Filed Dec. 5, 1952     3 Sheets-Sheet 3
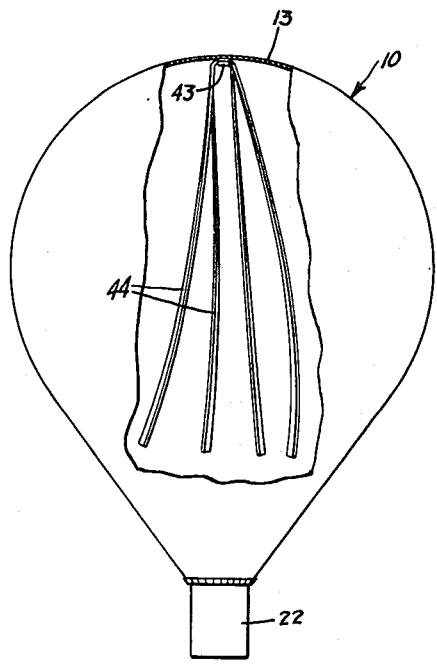
FIG. 10
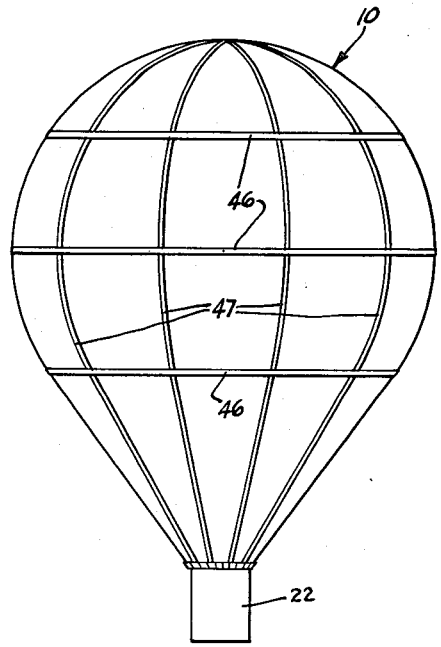
FIG. 11
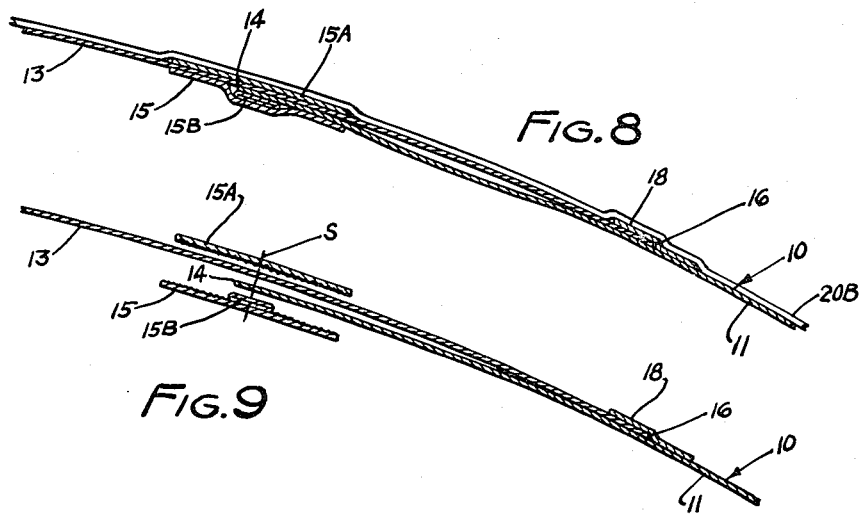
FIG. 8
FIG. 9
INVENTORS
OTTO C. WINZEN
BY VERA H. WINZEN
ATTORNEYS

United States Patent Office 2,756,948
Patented July 31, 1956

2,756,948

SKIN STRESSED BALLOON

Otto C. Winzen and Vera H. Winzen, Newport, Minn., assignors to Winzen Research, Inc., Minneapolis, Minn., a corporation of Minnesota Application December 5, 1952, Serial No. 324,223

14 Claims. (Cl. 244—31)

This application is a continuation-in-part of our application, Ser. No. 232,598, filed June 20, 1951, for Fast Rising Balloon, now Patent No. 2,681,774.

This invention relates to new and useful improvements in balloons and more particularly to new and useful improvements in a skin stressed plastic balloon wherein the payload is adapted to be secured to the skin of the balloon rather than to a load net, catenary ring, or continuous load carrying tapes.

It is therefore an object of this invention to provide a balloon of new and unique construction wherein the usual catenary ring, load net and continuous load carrying tapes have been eliminated;

It is also an object of this invention to provide a new and useful balloon in which the payload is suspended from the skin of the balloon;

It is another object of this invention to provide a balloon having a series of gores of thin gasproof material in which the necessary load is carried by the gores of the material;

Still another object of this invention is in the provision of a new and unique appendix and load harness construction for a balloon;

Another object of this invention is to provide a more reliable plastic balloon for high altitude exploration and having a reliable simplified appendix control valve;

Still another object of this invention is the provision of a sphero-conical balloon having a trailing edge of frusto-conical shape of substantially increased included angle whereby the balloon will be easier to assemble and to launch due to its shorter length, and more efficient due to relatively lower weight of the envelope;

Still another object of this invention resides in the provision of a novel means for rupturing the skin of the balloon;

A still further object of this invention is the provision of a radar reflective surface secured to the skin of a balloon whereby the balloon itself serves as a radar reflecting element;

Still another object of this invention is the provision of radar reflective surface means positioned within the interior of the balloon and agitated by the convection currents normally present within the balloon;

Still another object of this invention is to provide a balloon which is extremely light weight in construction and yet provided with superior load carrying abilities;

Still another object of this invention is to provide a balloon which may be folded and stored without deteriorating and in which failures from shifting and mispositioning load carrying tapes is minimized;

Still another object of this invention is to provide a balloon having improved floating properties and in which superheat is minimized by the elimination of any continuous load carrying tapes;

Other objects of this invention reside in the specific constructional details of the gores and appendix and cap structure, in the means for attaching the load harness to the balloon, and in the means for destroying the balloon after it has served its purpose so that during its descent it will not be a hazard to aerial navigation;

Other and further objects of this invention are those inherent and apparent in the apparatus as described, pictured and claimed.

This invention will be described with reference to the drawings, in which corresponding numerals refer to the same parts and in which:

Figure 1 is an elevational view of the balloon of the present invention illustrating the destruction tape and showing a load attached thereto;

Figure 3 is an enlarged cross-sectional view taken along the line and in the direction of the arrows 3—3 of Figure 1 and showing the destruction tape secured to one of the gores;

Figure 4 is a view similar to Figure 3 but taken in the direction of the arrows 4—4 of Figure 2;

Figure 5 is an enlarged fragmentary elevation of the balloon of Figure 1 with the number of gores reduced so as to show the details of the appendix and load carrying harness;

Figure 8 is an enlarged vertical sectional view taken along the line and in the direction of the arrows 8—8 of Figure 7 and showing the manner in which one of the gores is secured to the balloon cap;

Figure 9 is a view similar to Figure 8 but exploded to show the various layers of gore, balloon cap and seals;

Figure 10 is a schematic elevational view of the balloon partially broken away to show a plurality of radar reflective strips attached to the interior thereof;

Figure 11 is a view showing a plurality of horizontal and vertical reflective surfaces secured to the exterior of the balloon.

Figure 7:
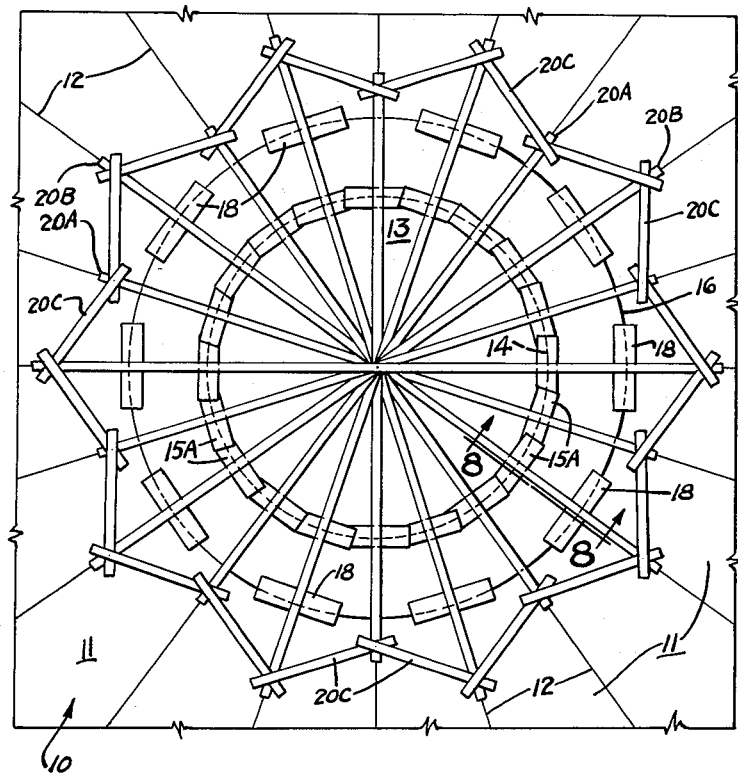
Figure 7 is a fragmentary top plan view of the instant invention showing the manner in which the gores are attached to the balloon cap.

Referring now to the drawings and particularly to Figure 1, there is shown the balloon generally designated 10, which comprises a plurality of gores 11, each secured to adjacent gores by seams 12. The gores 11 are made of relatively thin polyethylene sheets of one to four mils in thickness, and are heat sealed together. Each of the gores 11 is truncated at the top and joined to a cap member 13 as shown best in Figures 7 and 8 by terminal edge 14. Edge 14 of each of the gores 11 lies underneath the cap member 13 as is best shown in Figure 8.

The edge 14 is secured to the underside of cap member 13 by a heat seal along the line designated S. Positioned beneath edge 14 and heat seal S is a barrier 15B which is adhesively secured to a polyethylene strip 15 as shown in Figure 9. Strip 15 is adhesively secured to edge 14 and cap member 13 as best shown in Figure 8, and thus positions barrier 15B under seal S. A substantially identical strip 15A, rectangular in shape and conforming to the area of strip 15, is positioned on the exterior side of cap member 13 and over strip 15 as is shown in Figures 8 and 9. The strips 15 and 15A and the cooperating barriers 15B, comprise a plurality of relatively narrow, short adhesive fibre acetate strips. These relatively short strips are placed in overlapping position as shown in Figure 7 so that the heat seal S may better follow the circular contour provided by the terminal edges 14 of gores 11.

Edge 16 of a cap member 13 likewise overlies the terminal portions of the gores 11 as shown best in Figures 8 and 9. This edge is secured to gores 11 by a plurality of strips of adhesive fibre acetate 18 similar to strips 15 and 15A. As may be seen in Figure 7, these strips are spaced apart which serve to allow the annular space between the cap member and heat seal S to vent to atmosphere.

As is shown best in Figure 9, to seal the cap 13 to edges 14, edges 14 are positioned over the plurality of adhesive strips 15 having the barriers 15B fastened thereto and the strips 15 are thus secured thereto. The barriers 15B comprise several layers of any suitable insulating material such as cloth, fibre acetate, etc. Any material is usable which will dissipate and absorb the heat of the heat sealing machine. Cap 13 is then placed over edge 14 and secured to the gores 11 by means of the strips 15 and by the strips 16. A heat seal is made at S. The strips 15A, cap 13 and edge 14 are then heat sealed together along the line S and the heat of the sealing instrument is dissipated against the barrier 15B. A strip 15A is then placed on the exterior of the balloon in position over each of the strips 15.

The strips 15 and barriers 15B remain in the balloon when construction is complete. Although these barriers need not be attached to gores 11; hence would be loose and fall downwardly through the appendix of the completed balloon after seal S is made, we prefer that they be adhesively and securely positioned by means of strips 15 as shown.

Thus, the function of the barriers 15B is to prevent any seal S being established between the edge 14 and any other interior surface of the gore. This is necessary, inasmuch as the extremely long gores of the balloon are assembled before the relatively small cap is placed in position and it is exceedingly difficult and impractical to provide a surface against which to heat seal the cap to the gores without sandwiching adjacent parts of the gores between said surface and the heat being made. If it were not for the provision of the barrier strips 15 which dissipate the heat of the sealing instrument the seal would not only be established between the cap and the edge 14 but edge 14 would be secured to some mid-part of gores on the opposite side of the balloon.

A plurality of adhesive fibre acetate tapes 20A and 20B slightly longer in extension than the diameter of cap 13 is provided at the top of the balloon. These tapes 20 are placed so as to criss-cross the cap 13 and to extend downwardly along the seams 12 thereof as shown best in Figure 7. While we have used pressure-sensitive tapes in describing our invention, it is to be understood that thermo-sensitive tapes may be used without departing from the spirit and scope thereof.

Alternate criss-cross strips 20A are of lesser extension than the intervening alternate strips 20B and hence extend down the balloon A a shorter distance than alternate strips 20B as shown best in Figure 7. Joining adjacent ends of strips 20A and 20B are inclined strips 20C which form, with strips 20A and 20B, a reinforcing web around the top of the balloon of star-like configuration.

At the bottom of the balloon, as shown best with reference to Figure 5, the gores 11 terminate at edge 17, leaving an aperture open to atmosphere. Secured around this edge 17 and adapted to close the same is an appendix 22. Appendix 22 is a tubular skirt section of polyethylene which is sealed to the balloon 10 throughout its upper edge 23 thereof with a plurality of short tape sections or strips 24, similar to strips 15 and 18. The strips 24 are sealed to the balloon over the juncture of the appendix with the balloon as shown best in Figures 5 and 6. If it is desired, stiffening members of cardboard 24A or other material may be placed longitudinally in pockets of the appendix to impart stiffness as shown in Figure 6.

Attached to the gores 11 of the balloon, as shown best in Figure 5, is a plurality of load bearing tapes 25 which comprise a load bearing harness generally designated 26. Tapes 25 each comprise two plies of thermo-sensitive or pressure sensitive material placed face-to-face and each tape extends underneath the aperture formed by the terminal edge 17 of the gores 11 and has its ends 28 sealed to the balloon so as to form a sling or U-extension underneath as is indicated in Figure 5. The end of one ply is sealed to the interior of the balloon and the end of the other ply is sealed to the exterior thereof. Placed over each of the ends 28 of the exterior plies is a slightly larger patch 29 which is sealed to the material of the balloon and serves to provide additional strength to the juncture of ends 28 with balloon 10. Patches 29 may also be provided over the ends 28 of the interior plies, if desired. It may be noted with reference to Figure 5 that the edge 23 of the appendix and the tape sections 24 are positioned over the tapers 25. Each of the tapes 25 is passed through a load ring 30 and the load 31 is suspended therefrom by a suitable cord 32.

In the modification of the harness 26 as shown in Figure 5, each of the straps 25 is a sling member and extends through ring 30. In the preferred modification shown in Figure 6, the straps 25A and 25F are otherwise identical with straps 25 but comprise a single ply fastened to the exterior of the balloon which terminates at 25B and end 25C thereof is folded over and heat sealed to the main portion of the strap around a D-ring 25D. Attached to opposed D-rings is a cord 25E which is passed through ring 30 and serves as a sling for the ring. Thus, in the modification shown in Figure 6, instead of a sling member 25, there is provided two opposed tape sections 25A or 25F cooperating with an intermediate cord sling section 25E to support the load ring 30.

Figure 6:
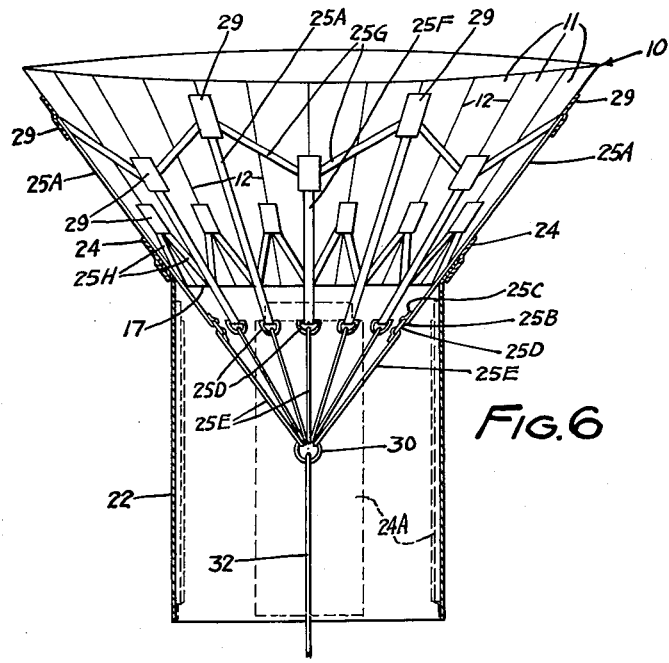
Figure 6 is a view similar to Figure 5 but showing a modified form of load harness construction.

It will be likewise noticed in the modification shown in Figure 6 that alternate tape members 25A are longer than the alternate tape members 25F so as to alternately stagger the level at which the load is transferred to the balloon. Connecting the adjacent ends of members 25A and 25F are inclined tapes 25G as shown best in Figure 6. Thus, the load is not only transferred to the balloons at different levels by virtue of the extension of the straps 25A and 25F but is transmitted throughout the entire periphery of the balloon by the members 25G. Positioned over the juncture of members 25G and members 25A and 25F are reinforcing patches 29.

Also shown in Figure 6 is a plurality of shorter load distributing tapes 25H which extend from the terminal edge of the balloon at the juncture of either member 25A or 25F with that edge and angularly and upwardly to the intermediate seam 12 as shown best in Figure 6. Positioned over the joining ends of strips 25H are patches 29.

Thus, in Figure 6, as in contrast to Figure 5, we show a preferred modification in which load supporting tapes 25A and 25F are positioned over alternate seams 12 of the balloon and intermediate load transferring members 25H extend from the omitted alternate seams 12 to the juncture of the tapes 25A and 25F with the terminal edge of the balloon. Furthermore, in the modification shown in Figure 6, we stagger the terminal ends of members 25A and 25F and connect these staggered ends with tapes 25G to form a star-shaped harness similar to that for the cap shown in Figure 7.

While the modification in Figure 6 is the preferred embodiment, it is to be understood that the ends of tapes 25A and 25F need not be staggered; might be positioned on the gores as shown in Figure 5; or the intermediate auxiliary tapes 25H may be dispensed with, all in accordance with this invention.

As shown in Figure 5, the tapes 25 are of two plies and are attached to the interior and exterior surface of the balloon. However, it is to be understood that they may be attached to the exterior surface only of the balloon or to the interior surface only of the balloon or both without departing from the spirit and scope of this invention. In the embodiment of Figure 5, pressure sensitive tapes having a pressure sensitive coating throughout their entire length are used, and it is the practice to attach one to the exterior of the balloon and a corresponding tape to the interior balloon placed directly beneath such exterior tape. Thus, in such a construction, the portions of the interior and exterior tapes which lie between edges 17 of the gores are sealed together and thus a double tape is provided which is passed through load ring 30.

In the modification of Figure 6, a plurality of exterior tapes 25A and 25F, and auxiliary tapes 25G is shown. However, it is to be understood that these tapes may likewise be placed on the exterior or interior of the balloon or both without departing from the spirit and scope of this invention.

Referring now specifically to Figure 1, the included angle of the depending balloon cone is shown as an angle of 75°. Through extensive experimentation, we have found that an included angle of from 75° to 125° and preferably one of 90° together with the weight saving due to suspending the load from the skin of the balloon will provide a balloon having a higher ceiling limit than has heretofore been provided.

Referring now specifically to Figure 1, attached to the load ring 30 by cord 32 is an explosive timer, generally designated 33. This timer 33 comprises a clock mechanism containing a small explosive charge adapted to detonate after a predetermined interval and sever the cord 32. Positioned on cord 32 beneath the explosive timer is parachute 34 having shroud lines 35 to which is attached the payload 31.

Disposed on one of the gores 11 is a destruction tape, generally designated 39. Tape 39 is a relatively narrow thermo-sensitive or pressure sensitive tape of glass filament or other flexible material which is sealed throughout its length to a point 36 to gore 11. The depending end 37 of destruction tape 39 is then tied or otherwise secured to the release ring 38 of parachute 34.

Thus, it will be seen that when the explosive timer detonates to sever cord 32 the weight of the load and the parachute will be shifted from cord 32 to tape 39. The shock of the transfer of the load from cord 32 to tape 39 will transfer the load to one gore 11 and, as the material of the gore is insufficient to support such a load, will tear it asunder, and air will rush into the balloon, whereupon it will fall to the ground. After the lifting power of the balloon is thus destroyed, the parachute 34 will open to gently carry the load to the ground.

Figure 2:
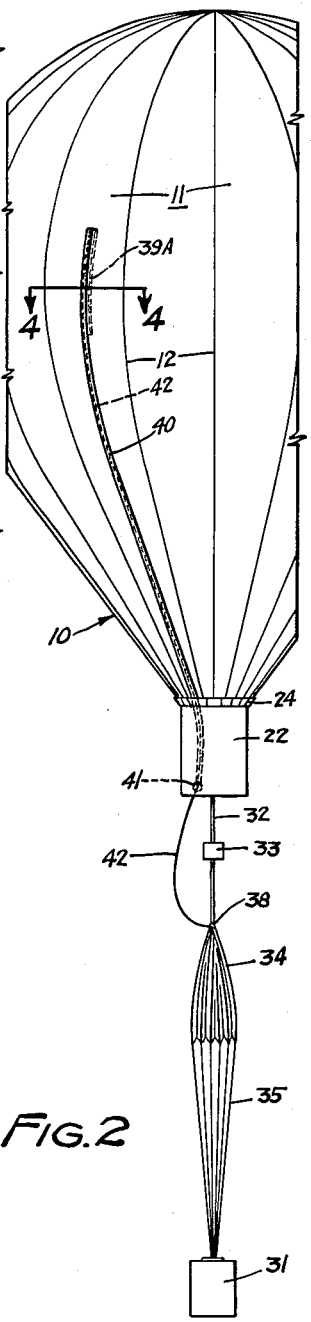
Figure 2 is a fragmentary elevation similar to Figure 1, but showing a modified form of the destruction tape.

As shown in Figures 1 and 3, the destruction tape comprises merely a length of tape secured to one of the gores 11. However, in the modification shown in Figures 2 and 4, the destruction tape comprises a length of tape 40 having its free end secured to D-ring 41 and a nylon, steel or other cord 42 is secured at one end to D-ring 41 and at the other end to release ring 38. It will be noted that in the modification shown in Figures 2 and 4 that the cord 42, in addition to being secured to D-ring 41 extends beneath the tape 40 through the extent thereof.

We have found it preferable to extend the destruction tape above the equator of the balloon through the skin and to double it back as at 39A in order that an aperture will be "ripped" in the balloon by the shock of the transfer of the payload to the destruction tape which aperture extends substantially the length of the balloon. This destruction tape comprises usually a glass filament pressure or heat sensitive tape preferably one inch wide, but, it is to be understood, that it may be formed of varying materials and widths all within the scope of this invention. It is attached to the release ring of the parachute before the balloon ascent. At the time of the detonation of the automatic timer and explosive line cutter, the destruction tape leaves a long gap in the balloon equal to the width and length of the tape.

Referring now to Figure 10, the balloon 10 is illustrated diagrammatically. Secured to the interior of the cap member 13 of balloon 10 by a pressure or heat sensitive tape 43 is a plurality of depending strips 44, strips 44 being secured to as to hang freely down the interior of the balloon. These strips are comprised of polyethylene, plio- film or other plastic material coated with a metallic radar reflective material such as aluminum. The provision of their being secured only at the apex of the balloon allows the relatively light aluminum coated plastic strips to move or constantly vibrate due to the continual convection currents within the balloon as the balloon rises.

Referring now to Figure 11, there is shown the balloon 10 in diagrammatic view with a plurality of horizontal radar reflective tapes 46 and a plurality of vertical radar reflective tapes 47. Tapes 46 may be either continuous or small interrupted strips as may tapes 47. Thus, there is provided a plurality of metallic coated plastic surfaces which are sealed to the balloon either in continuous bands or in interrupted bands and either horizontally or vertically, or both. These tapes may be applied horizontally or vertically and in widths to suit the type of radar desired to be reflected. While not necessary, it is usually found desirable to position these tapes to cover the plastic seams 12 of the individual gores. However, while this is to be preferred, the strips may be placed elsewhere.

The radar reflector tapes are usually one or two inches in width and have a length extension of one-fourth or one-half of the wave length of the radar being reflected. Thus, radar waves having a wave length of 10 cm. is a common type of radar and the tapes, if interrupted would then be 5 cm. in length.

As many apparently widely differing embodiments of this invention may be made without departing from the spirit and scope thereof, it is to be understood, that we do not specifically limit ourselves to the particular embodiment disclosed herein.

What we claim is:

1. A skin stressed balloon comprising in combination a plurality of vertically disposed gores joined together throughout adjacent edges so as to form a streamlined envelope having a relatively blunt upper end and a substantially frusto-conical lower end, a plurality of tape strips having their terminal ends affixed to opposite sides of the envelope and extending beneath said substantially frusto-conical lower end to form a sling means and means for attaching a load thereto, and a tubular skirt positioned exterior of said frusto-conical end.

2. A balloon comprising a streamlined envelope having a relatively blunt upward end and a substantially frusto-conical trailing end, a tubular flexible skirt having one end secured adjacent said frusto-conical trailing end, and load supporting means positioned within said tubular flexible skirt.

3. A skin stressed balloon comprising in combination a plurality of gores of thin flexible material secured throughout adjacent edges so as to provide an envelope having a rounded top and a frusto-conical bottom, said frusto-conical bottom being open to atmosphere, an extending tubular skirt extending beyond said opening, a plurality of load supporting members attached to the bottom of said gores adjacent said opening, at least a portion of said members positioned interior of said skirt, said load supporting members extending upwardly from the terminal edge of said envelope and secured thereto from the terminal edge of said envelope to the terminal end of said tapes, and reinforcing patches slightly larger than the width of said members and sealed to said envelope to cover the juncture of the terminal ends of said members with said envelope.

4. A balloon comprising in combination a streamlined shape having a relatively blunt forward end an a frusto-conical trailing end, means for suspending a load from said balloon, a destruction tape sealed to the envelope of said balloon throughout a portion thereof and attached at its free end to said load, and means for abruptly transferring said load supporting means to said destruction tape whereby said destruction tape will rupture the skin of said envelope.

5. A balloon comprising in combination a streamlined shape having a relatively blunt forward end and a frusto-conical trailing end, means for suspending a load from said balloon, a destruction tape sealed to the envelope of said balloon throughout a portion thereof, a cord member integral with said destruction tape, and attached at one end to said load, and means for abruptly transferring said load supporting means to said cord member for rupturing the skin of said envelope.

6. A balloon comprising in combination a plurality of flexible gores sealed to each other at adjacent edges to provide a plurality of seams, said seams being uncovered throughout the major portion of their length and a load supporting means attached directly to said gores.

7. The structure of claim 6 further characterized by said load supporting means comprising a plurality of tape strips, said tape strips having adhesive on one side thereof, said tape strips being doubled back upon themselves to form two portions having adhesive surfaces facing each other and joined by a loop, said doubled portions each secured to one side of the balloon throughout a portion thereof and secured to each other throughout a portion thereof, an attachment means portion having an extension at right angles to the extension of said tape strips and positioned in the loop end formed by the doubling of said tape strips, cord means secured to each of said attachment means and uniting the attachment means for all of said tape strips to a common load attachment member.

8. A balloon comprising in combination a plurality of flexible gores sealed to each other at adjacent edges to provide a plurality of seams and a load supporting means comprising a plurality of load supporting members attached directly to said gores and substantially out of engagement with said seams.

9. A balloon comprising a plurality of flexible gores of flexible gas-proof sheet material sealed to each other at adjacent edges to form a plurality of seams and means for suspending a load directly from the bottom portions of said gores only.

10. A balloon comprising in combination an envelope of flexible material provided with a frusto-conical bottom, said frusto-conical bottom being opened to the atmosphere and an extending tubular skirt extending beyond said opening, a plurality of load supporting members attached to the bottom of said envelope adjacent said opening and at least a portion of said members positioned interior of said skirt.

11. The apparatus of claim 10 further characterized in that said load supporting members comprise a plurality of tapes, each of said tapes having a portion secured to said envelope and a portion extending beyond said opening and said skirt being secured to said envelope intermediate said opening and the ends of said tapes.

12. The apparatus of claim 4 further characterized by said destruction tape having a portion thereof penetrating said envelope and secured to the interior thereof and a portion thereof secured to the exterior thereof.

13. A balloon comprising in combination a plurality of flexible gores sealed to each other at adjacent edges to provide a plurality of seams, said seams being uncovered throughout the major portion of their length, a load supporting means attached directly to said gores, said load supporting means comprising a plurality of tapes extending substantially in the direction of said seams, and spaced with reference to one another, and intermediate diagonal tape means connecting adjacent members of said plurality of tapes.

14. The apparatus of claim 13 further characterized by reinforcing patches larger than the width of said tapes and sealed to said envelope to cover at least some of the ends of said tapes.

References Cited in the file of this patent

UNITED STATES PATENTS

| 1,035,560 | Erdmann | Aug. 13, 1912 |
| 2,448,269 | Loudenslager | Aug. 31, 1948 |
| 2,463,517 | Chromak | Mar. 8, 1949 |
| 2,489,337 | Sperling | Nov. 29, 1949 |
| 2,526,719 | Winzen | Oct. 24, 1950 |
| 2,598,696 | Huch | June 3, 1952 |

FOREIGN PATENTS

| 9,060 | Sweden | June 25, 1898 |
| 127,633 | Great Britain | June 12, 1919 |